Figure 1:
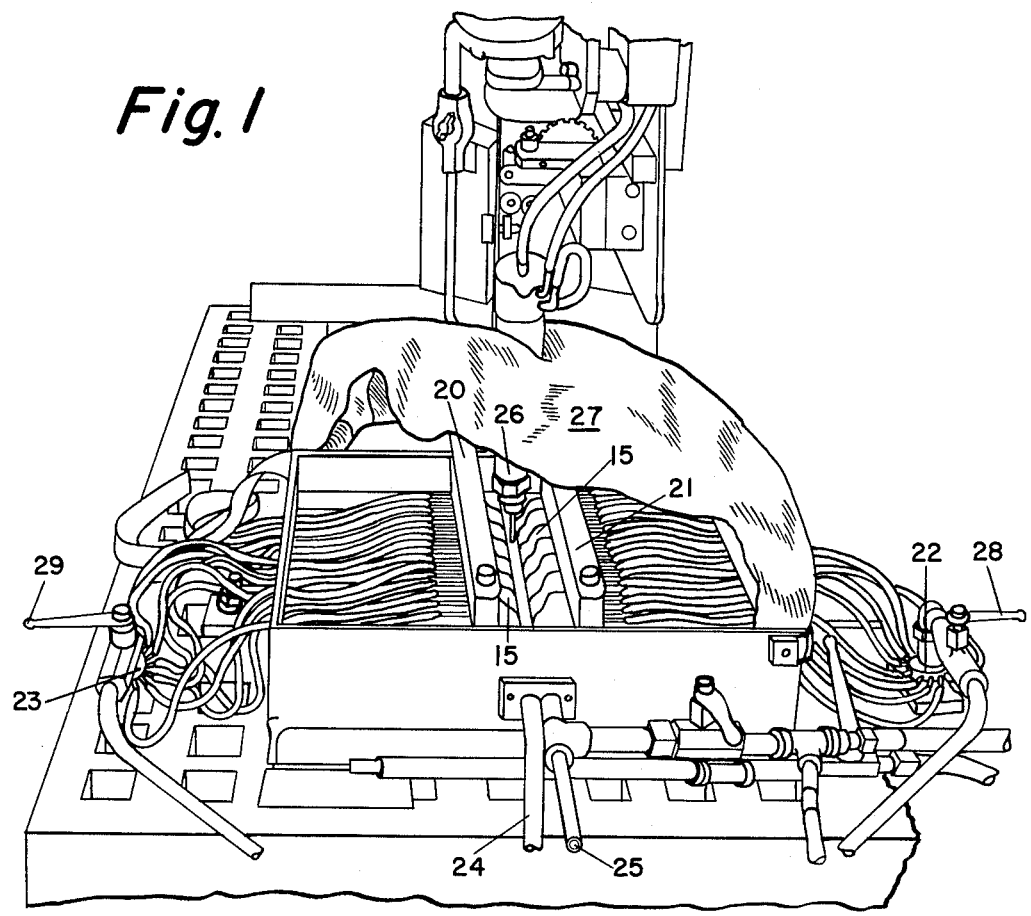

Nov. 9, 1965  D. E. SCHILLINGER  3,217,132
WELDING TECHNIQUE FOR ALUMINUM ALLOYS
Filed July 29, 1963

INVENTOR.
DAVID E. SCHILLINGER
BY Edward Kelly
ATTORNEY

3,217,132
WELDING TECHNIQUE FOR ALUMINUM ALLOYS
David E. Schillinger, Philadelphia, Pa., assignor to the United States of America as represented by the Secretary of the Army
Filed July 29, 1963, Ser. No. 298,510
3 Claims. (Cl. 219—74)
(Granted under Title 35, U.S. Code (1952), sec. 266)

The invention described herein may be manufactured and used by or for the Government for governmental purposes without the payment to me of any royalty thereon.

This invention relates to the welding of aluminum alloys such as those bearing the designation 2014–T6 and 2024–T86. It provides an improved welding apparatus and method of operation whereby the tensile and yield strengths of such alloys are substantially increased.

Welds of these alloys have been made heretofore by arc fusion methods. Such welds, however, have not possessed tensile properties as high as desired. The present invention solves this problem by maintaining the parts to be welded and the fixture on which they are supported at a temperature below zero degrees Fahrenheit. The principles underlying this method are that (1) the width of the heat affected zone is decreased and (2) the quenching rates in both the weld metal and the heat affected zones is increased, resulting in finer interdendritic cell size in the weld bead and greater retention of solutes in solid solution in both the weld bead and heat affected zone. Greater retention of solutes in solid solution in turn permits greater response to artificial and natural aging.

The invention will be better understood from the following description when considered in connection with the accompanying drawings and its scope is indicated by the appended claims.

Figure 2:
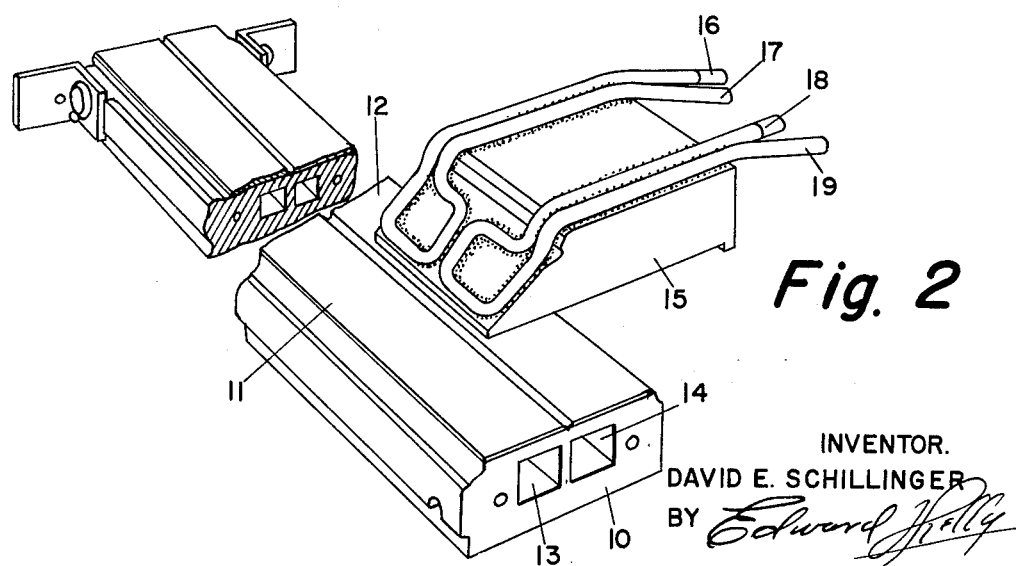

Referring to the drawings:

FIG. 1 illustrates one of the various forms of welding apparatus suitable for carrying the invention into effect, and FIG. 2 indicates the relation between a backup bar and hold down shoes of the apparatus illustrated by FIG. 1.

As shown in FIG. 2, the backup bar 10 supports a pair of sheets 11 and 12 and has extending through it two passageways 13 and 14. The sheets or work pieces 11 and 12 may consist of the aluminum alloy 2014–T6 and may have a thickness of the order of 0.090 inch. They are held against the backup bar 10 by a series of shoes 15 only one of which appears in FIG. 2.

Each of these hold down shoes 15 has two pairs of tubular connections 16–17 and 18–19 through which a coolant may be circulated during the welding operation and through which warm air or brine may be circulated after the termination of the weld, this warm air or brine being utilized to prevent the condensation of moisture upon the exposure of the weld to the atmosphere.

The hold down shoes 15 are fixed to supports 20 and 21 (FIG. 1). Coolant introduced into the bottom of a spider 22 is fed to the shoes mounted on the support 21 and coolant introduced into the bottom of a spider 23 is fed to the shoes mounted on the support 20. Coolant is also introduced into the passageways 13 and 14 of the backup bar 10 (FIG. 2) through pipes 24 and 25 (FIG. 1). The coolant supplied to the hold down shoes and backup bar may be a $CaCl_2$ brine having an initial temperature of the order of $-55°$ F.

Filler metal is supplied to the weld through an arc welding head 26 in a manner well understood by those skilled in the art. A polyethylene inclosure 27, shown in FIG. 1 as partially broken away, encloses a dry inert gas for preventing the condensation of atmospheric moisture as the works and fixture are cooled.

In making the weld, coolant is pumped through the coolant passages until equilibrium is approached (backup bar temp. $-25°$ F. and shoe temp. $-35°$ F.). Welding by the MIG, DCRP spray transfer process is then initiated, MIG signifying gas shielded, consumable electrode arc welding and DCRP signifying direct current reverse polarity. Circulation of the coolant is continued until the weld is completed.

Prior to removing the inclosure or bag 27, warm brine or warm air is circulated through the coolant passageways to prevent condensation of moisture on the fixture and work. This is accomplished by means of valves 28 and 29 which open into the tops of spiders 22 and 23.

Welds made by the foregoing procedure may be naturally or artificially aged to produce higher yield and tensile strengths than are obtained by conventional welding methods. The extent to which this is accomplished in the case of the aluminum alloy 2014–T6 is indicated by the following data wherein the symbol K s. i. signifies thousands of pounds per square inch.

*Tensile property levels attained in 2014–T6 by conventional arc welding methods*

| YS (K. s.i.) | TS (K. s.i.) | Percent Elong./2" | Aging Treatment |
|---|---|---|---|
| 42–45 | 52–56 | 1–3 | Natural |
| 53–53 | 55–56 | 1–3 | Artificial |

*Tensile property levels attained in 2014–T6 wih low temperature coolants*

| YS (K. s.i.) | TS (K. s.i.) | Percent Elong./2" | Aging Treatment |
|---|---|---|---|
| 49–50 | 62–63 | 1–2 | Natural |
| 58–60 | 64–65 | 1–3 | Artificial |

These data show an improvement of about 10 percent in yield strength and about 20 percent in tensile strength of the aluminum alloy 2014–T6.

I claim:

1. The method of welding aluminum alloy sheets comprising the steps of abutting the ends of the sheets to be welded, clamping said sheets in fixed relationship, establishing a dry inert gas atmosphere about said ends, circulating a sub-zero temperature coolant in close proximity to said ends, forming a weld between said ends while continuing circulation of said coolant, discontinuing circulation of said coolant, circulating a heating fluid in close proximity to said ends and maintaining the inert gas atmosphere until conditions of weld contamination have ceased to exist.

2. The method of welding aluminum alloy sheets comprising the steps of abutting the ends of said sheets to be welded, clamping said sheets in fixed relationship, establishing a dry inert gas atmosphere about said ends, circulating a $CaCl_2$ brine having an initial temperature of $-55°$ F. in close proximity to said ends, forming a weld between said ends while continuing circulation of said brine, discontinuing circulation of said brine, circulating warm air in close proximity to said ends and maintaining the inert gas atmosphere until conditions of weld contamination have ceased to exist.

3. The method of welding aluminum alloy sheets comprising the steps of providing a back-up bar, placing said sheets on said back-up bar with the ends in abutting relationship, providing a plurality of clamps, clamping said sheets in fixed relationship, establishing a dry inert gas atmosphere about said ends, circulating a −25° F. coolant through said back-up bar, circulating a −35° F. coolant through said plurality of clamps, forming a weld between said ends while continuing circulation of said coolant, discontinuing circulation of said coolant, circulating a heating fluid through said back-up bar and said plurality of clamps, and maintaining the inert gas atmosphere until conditions of weld contamination have ceased to exist.

References Cited by the Examiner

UNITED STATES PATENTS

| 2,849,592 | 8/58 | Hawthorne | 219—161 X |
| 2,856,509 | 10/58 | Stanchus | 219—74 |
| 2,922,870 | 1/60 | Collins et al. | 219—161 |

RICHARD M. WOOD, *Primary Examiner.*

JOSEPH V. TRUHE, *Examiner.*